US011827141B2

(12) United States Patent
Bennett

(10) Patent No.: US 11,827,141 B2
(45) Date of Patent: Nov. 28, 2023

(54) AUXILIARY SPARE TIRE BRAKE LIGHT FOR VEHICLES

(71) Applicant: OMIX-ADA, Inc., Ann Arbor, MI (US)

(72) Inventor: Patrick W. Bennett, Gainesville, GA (US)

(73) Assignee: OMIX-ADA, INC., Ann Arbor, MI (US)

( * ) Notice: Subject to any disclaimer, the term of this patent is extended or adjusted under 35 U.S.C. 154(b) by 0 days.

(21) Appl. No.: 17/727,070

(22) Filed: Apr. 22, 2022

(65) Prior Publication Data

US 2022/0242303 A1 Aug. 4, 2022

Related U.S. Application Data

(63) Continuation of application No. 17/233,603, filed on Apr. 19, 2021, now Pat. No. 11,338,726, which is a (Continued)

(51) Int. Cl.
*B60Q 1/26* (2006.01)
*B60Q 1/00* (2006.01)
(Continued)

(52) U.S. Cl.
CPC ......... *B60Q 1/2661* (2013.01); *B60Q 1/0035* (2013.01); *B60Q 1/0052* (2013.01);
(Continued)

(58) Field of Classification Search
CPC .. B60Q 1/2661; B60Q 1/0035; B60Q 1/0052; B60Q 1/0088; B60Q 1/2696; B60Q 1/30;
(Continued)

(56) References Cited

U.S. PATENT DOCUMENTS 4,214,683 A 7/1980 Wills et al.
5,530,630 A 6/1996 Williams, Jr.
(Continued)

FOREIGN PATENT DOCUMENTS

CN 205706392 U 11/2016
EP 1729374 A1 12/2006
(Continued)

OTHER PUBLICATIONS

English Translation of WO 2014201678 A1; colored lamp; Liu (Year: 2014).*

(Continued)

*Primary Examiner* — Zheng Song
*Assistant Examiner* — Glenn Zimmerman
(74) *Attorney, Agent, or Firm* — The Dobrusin Law Firm, P.C.

(57) ABSTRACT

An auxiliary spare tire brake light is provided for a vehicle having a spare tire with a rim that has spokes and openings and that is secured on lugs at the back of the vehicle. The auxiliary spare tire brake light includes a support disc having a central portion and a peripheral portion. An array of openings is formed in the central portion of the support disc and the openings are positioned to fit over the lugs at the back of the vehicle for positioning the support on the lugs behind the rim of the spare tire. An annular race extends around the peripheral portion of the support and a plurality of lights in the form of LEDs is disposed in the race. The LEDs are arrayed in a closely spaced substantially continuous array around the support to form a ring of LEDs. A wire and electrical connector electrically connect the plurality of LEDs to the brake circuitry of the vehicle so that the LEDs are illuminated when the vehicle's brake pedal is depressed, A first portion of the ring of LEDs align with and project light directly through the openings in the rim of the spare tire (Continued)

to be seen from behind as an indication that the vehicle is braking. A second portion of the ring of LEDs aligns behind the spokes and reflects off of the backs of the spokes to silhouette the rim against the glow of the reflected light.

15 Claims, 3 Drawing Sheets

Related U.S. Application Data continuation of application No. 16/485,507, filed as application No. PCT/US2018/022119 on Mar. 13, 2018, now Pat. No. 11,007,928, which is a continuation of application No. 15/457,511, filed on Mar. 13, 2017, now Pat. No. 10,322,667.

(51) Int. Cl.
*B60Q 1/44* (2006.01)
*B60Q 1/30* (2006.01)
*F21S 43/15* (2018.01)
*F21S 43/14* (2018.01)
*B62D 43/02* (2006.01)

(52) U.S. Cl.
CPC ......... *B60Q 1/0088* (2013.01); *B60Q 1/2696* (2013.01); *B60Q 1/302* (2013.01); *B60Q 1/44* (2013.01); *F21S 43/14* (2018.01); *F21S 43/15* (2018.01); *B62D 43/02* (2013.01)

(58) Field of Classification Search
CPC .......... B60Q 1/302; B60Q 1/44; B60Q 1/326; F21S 43/14; F21S 43/15; B62D 43/02
See application file for complete search history.

(56) References Cited

U.S. PATENT DOCUMENTS

| | | | |
|---|---|---|---|
| 5,700,012 | A | 12/1997 | Froehlich et al. |
| 5,800,035 | A | 9/1998 | Aichele |
| 6,098,855 | A | 8/2000 | Grabowski et al. |
| 6,322,237 | B1* | 11/2001 | Lee ................. B60Q 1/326 362/249.05 |
| D570,012 | S | 5/2008 | Huang |
| D578,230 | S | 10/2008 | Huang |
| D578,677 | S | 10/2008 | Huang |
| D578,678 | S | 10/2008 | Huang |
| D578,680 | S | 10/2008 | Huang |
| D586,486 | S | 2/2009 | DiPenti et al. |
| 7,859,391 | B1 | 12/2010 | Solis |
| 10,322,667 | B2 | 6/2019 | Bennett |
| 11,338,726 | B2* | 5/2022 | Bennett ............ B60Q 1/30 |
| 2002/0085390 | A1 | 7/2002 | Kiyomoto |
| 2003/0169595 | A1* | 9/2003 | Lee ................. B60Q 1/326 362/500 |
| 2004/0042227 | A1* | 3/2004 | Gloodt ............ B60Q 1/326 362/249.05 |
| 2004/0145463 | A1 | 7/2004 | Weatherspoon |
| 2006/0044817 | A1* | 3/2006 | Terry ............... B60B 7/0013 362/500 |
| 2008/0309477 | A1 | 12/2008 | Dakov |
| 2011/0260598 | A1* | 10/2011 | Liu ................. F21K 9/20 313/46 |
| 2013/0051046 | A1* | 2/2013 | Yeh ................. F21S 43/15 362/487 |
| 2013/0155713 | A1* | 6/2013 | Law ................. F21S 43/195 362/545 |
| 2013/0249394 | A1* | 9/2013 | Fay ................. B60Q 1/2696 315/297 |
| 2014/0022808 | A1* | 1/2014 | Chan ............... F21S 41/143 362/516 |
| 2014/0340917 | A1* | 11/2014 | Harraghy .......... B60Q 1/326 362/500 |
| 2015/0137965 | A1 | 5/2015 | Lanham |
| 2016/0214526 | A1 | 7/2016 | Otero |
| 2016/0341377 | A1* | 11/2016 | Eddins ............ F21V 21/005 |
| 2018/0178723 | A1 | 6/2018 | Diaz |

FOREIGN PATENT DOCUMENTS

| | | |
|---|---|---|
| JP | 07-137575 A | 5/1995 |
| JP | 2002-154395 A | 5/2002 |
| WO | WO-2014201678 A1 * 12/2014 ............. H04R 1/028 |

OTHER PUBLICATIONS

Colorado JL, 3rd brake light mod 2.0 for JK, Jeep Wrangler, Jan. 4, 2016 https://www.youtube.com/watch?v=HYC5TgQ2qU4 Jan. 4, 2016; (Year: 2016).*
CPO LED Third Brake Light How-To: https://www.youtube.com/watch?v=7WaTsjufPVk Jan. 12, 2016 (Year: 2016).*
Colorado JL, 3rd brake light mod 2.0 for JK, Jeep Wrangler, Transcript and Scenes, Jan. 4, 2016 https://www.youtube.com/watch?v=HYC5TgQ2qU4 (Year: 2016).*
Colorado JK, 3rd brake light mod 2.0 for JK Jeep Wrangler [online], Jan. 4, 2016 [retrieved on Jun. 5, 2018]. Retrieved from the Internet: //www.youtube.com/watch?v=HYC5TgQ2qU4 See summary and the whole video.
Steven Olsewski, Sema 2016: Rugged Ridge Outfits The Jeep JK With New Access ories [online], Nov. 9, 2016 [retrieved on Jun. 5, 2018]. Retrieved from the Internet: <URL: http://www.offroadxtreme.com/features/sema-coverage/sema-2016-rugged-ridge-outfits-the-jeep-jk-with-new-accessories></URL:> See p. 5, figure.
PCT Search Report & Written Opinion dated Jul. 11, 2018, Application No. PCT/US2018/022119.
OVERLOCK3D Jeeps, CPO LED Third Brake Light How-To, https://www.youtube.com/watch?v=7WaTsjufPVk, published on Jan. 12, 2016, last accessed Nov. 14, 2018.
Examination Report from the German Patent and Trademark Office for Application o. 11 2018 000 844.4 dated Sep. 27, 2019.
3rd brake light mod 2.0 for JK Jeep Wrangler; Colorado JK; https://www.youtube.com/watch?v=HYC5TgQ2qU4; Jan. 4, 2016.
Colorado JK, 3rd brake light mod 2.0 for JK Jeep Wrangler [online], Jan. 4, 2016; https://www.youtube.com/watch?v=HYC5TgQ2qU4 2018 (Year: 2018).
Steven Olsewski, Sema 2016: Rugged Ridge Outfits The Jeep JK With New Accessories, Nov. 9, 2016, https://www.offroadxtreme.com/features/sema-coverage/sema-2016-rugged-ridge-outfits-the-jeep-jk-with-new-accessories/ p. 5 (Year: 2016).

* cited by examiner

AUXILIARY SPARE TIRE BRAKE LIGHT FOR VEHICLES

TECHNICAL FIELD

This disclosure relates generally to automotive lights and more specifically to automotive brake lights on the rear of a vehicle.

BACKGROUND

For many years, vehicle tail lights and brake lights have generally comprised red colored lights on either side of the back of the vehicle. In some cases, tail lights and brake lights are separate and in others the tail light and brake light functions are combined in a single light. In either case, tail lights are illuminated when the vehicles headlights are on to make the vehicle visible from behind. A switch triggered by depression of the brake pedal inside the vehicle causes the brake lights to light red or, in the case of combined function lights, causes the single function light to illuminate or increase in brightness when the brakes are applied. This warns that the vehicle is braking so that vehicles behind can prepare to slow down or stop to avoid a rear-end collision.

In recent years, vehicles have increasingly incorporated a third or auxiliary rear facing brake light to enhance the warning when brakes are applied. In some instances, the auxiliary brake light is located in the middle of and high on a vehicle so that it can be seen easily when the traditional side brake lights are obscured. In other cases, such as with Sport Utility Vehicles (SUVs) the auxiliary brake light may be a string of light emitting diodes (LEDs) that curve upwardly along the sides of a vehicle to a height where they are easily visible from behind. Other variations exist, but the end result is that the addition of auxiliary brake lights is more effective than a simple pair of brake lights on either side of the vehicle.

Some types of vehicles know as off-road vehicles usually carry a spare tire on the back of the vehicle. The spare tire has a rim fastened to threaded lugs of a support structure and a tire mounted to the rim. Such vehicles include, for example, the very popular Jeep® Wrangler® and the Jeep® CJ® model off-road vehicles. These vehicles may be equipped with a factory auxiliary brake light perched atop an arm just above the upper tread of the spare tire. While this arrangement does provide an auxiliary brake light, the light is relatively low on the vehicle and does not provide the unignorably vivid display from behind that some Jeep® owners' would prefer. Further, many owners of off-road vehicles exchange the stock-sized wheels (and thus the spare tire) for larger diameter wheels better suited for off-road terrain. The larger spare tire can cover the stock auxiliary brake light or require its removal, rendering the auxiliary brake light ineffective. Even raising an off-road vehicle through suspension modifications can cause the auxiliary brake light to be obscured from behind by the now higher-up spare tire.

Attempts have been made to provide an auxiliary brake light for off-road vehicles that is visible, vivid, and distinctive from behind regardless of the size of the spare tire and regardless of the height to which the vehicle is raised. For example, some have mounted lights behind the spare tire aligned with openings between spokes of the rim. When the vehicle's brakes are applied, these lights illuminate and shine through the openings in the rim to be seen from behind. One problem is that there are many rim designs with different patterns of spokes and openings and each requires its own pattern of lights that align with the openings. In other words, one arrangement of lights is not universal to all rim designs. Further, the lights must be mounted in a particular rotational alignment with the rim in order for them to line up with the openings and are thus not universal in this regard either. In addition, most of the light shines directly through the rim openings, which can make the rim itself hard to see at night.

A need exists for an auxiliary brake light configured to be mounted behind the spare tire of an off-road vehicle that is universal in that it works well with wheels of all designs and does not need to be rotationally aligned with the rim. A further need exists for an auxiliary tail light or brake light that does not render the rim dark and hard to see at night but rather emphasizes the rim. This provides an even more vivid and hard-to-ignore appearance when brakes are applied. It is to the provision of a universal auxiliary tail light that addresses these and other needs that the present invention is primarily directed.

SUMMARY

Briefly described, an auxiliary brake light is disclosed for being mounted on lugs behind the spare tire of an off-road vehicle, or any vehicle with a spare tire carried on the back of the vehicle. The auxiliary brake light includes a disc-shaped support having a diameter less than the diameter of the rim of the spare tire. A depressed annular groove or race is formed around a perimeter of the disc-shaped support on its rear-facing side. A substantially continuous ring of torch-red lights, preferably in the form of side-by-side LEDs, is captured within the depressed race and the lights are oriented to project their light rearwardly. Elongated mounting holes in the central portion of the support disc adapt to various patterns of lugs to which a spare tire may be mounted. In use, the auxiliary brake light is placed on the lugs that support the spare tire and wired to the existing brake light circuitry of the vehicle. The spare tire is then mounted on the lugs over the auxiliary brake light and secured with lug nuts in the normal way.

With the auxiliary brake light mounted as described, the ring of red LEDs are disposed behind the rim of the spare tire. Portions of the ring are disposed behind the spokes of the rim and other portions are visible directly through openings between the spokes of the rim. This is true regardless of the spoke pattern, orientation of the spare tire, and configuration of openings between the spokes. In this way, the auxiliary brake light is universal.

When the vehicle brakes are applied, the LEDs of the ring emit bright torch-red light. Light from the portions visible through openings in the rim shines straight through the openings and is directly visible from behind. Light from portions disposed behind the spokes, however, reflects from the backs of the spokes onto the tail gate behind the spare tire. This produces a unique torch-red glow of light behind the rim that silhouettes the rim against the tail gate of the vehicle. The result is that the rim is highlighted at night in a highly distinctive display that is virtually impossible to ignore from behind. This makes the auxiliary brake light significantly more effective than the prior art.

Thus, a unique auxiliary brake light is now provided that is universal, easily mountable, and that provides a distinctive light display when the brakes are applied that is attention grabbing to drivers behind the vehicle. Rear-end collisions caused by the failure to notice brake lights can thus be reduced. These and other aspects, features, and advantages of the auxiliary brake light of this invention will be better appreciated upon review of the detailed description set forth below taken in conjunction with the accompanying drawing figures, which are briefly described as follows.

DETAILED DESCRIPTION

Figure 1:
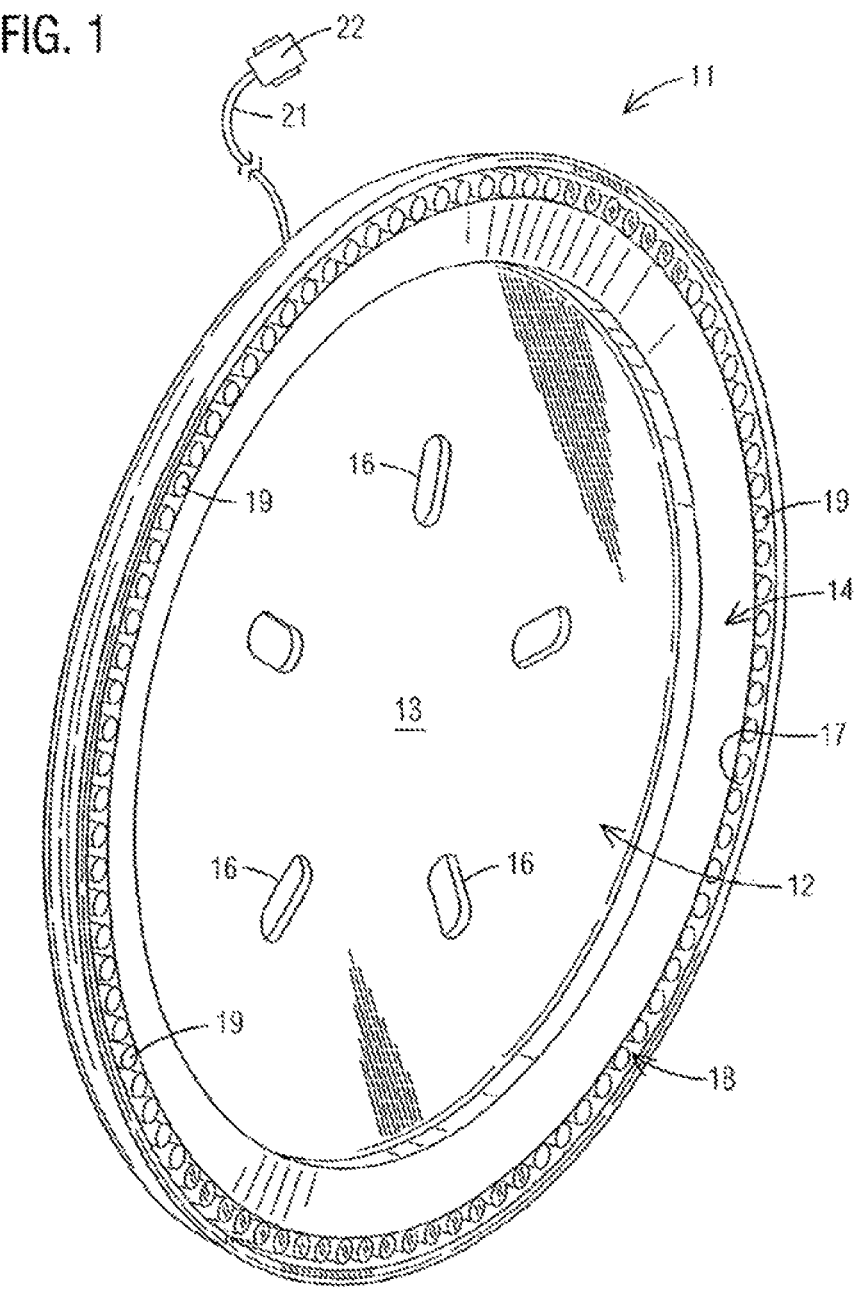
FIG. 1 is a perspective view of an auxiliary brake light for vehicles that embodies principles of the invention in one preferred embodiment.

Referring now in more detail to the drawing figures, wherein like reference numerals indicate like parts throughout the several views, FIG. 1 shows one embodiment of an auxiliary spare tire brake light according to principles of the invention. The brake light 11 includes a circular support disc 12 having a central portion 13 and a peripheral portion 14. An array of five (5) elongated openings 16 is formed through the support disc 12 in the central portion 13. These openings 15 are positioned and sized so that the support disc 12 can be received on arrays of lugs of different configurations at the back of a vehicle. A spare tire also is mounted to the vehicle via the same lugs capturing the auxiliary brake light between the spare tire and the tail gate of the vehicle. The elongated openings 16 are sized and positioned to be received on either a "5 on 4.5 inch" or a "5 on 5 inch" lug pattern so that the auxiliary brake light can be used with smaller and larger spare tires. In at least this sense, the auxiliary brake light 11 may be said to be universal.

An annular groove or race 17 is formed in the peripheral portion 14 of the support disc 12 and extends around the edge of the support disc. A continuous ring of lights 18 is disposed in the annular race and the lights are oriented to project light rearwardly away from the vehicle when illuminated. In the preferred embodiment, the continuous ring of lights 18 is formed by a plurality of closely spaced, interconnected, side-by-side light emitting diodes (LEDs) 19 formed into the shape of the ring.

The ring of LEDs preferably is pressed into the annular race and is held in place within the race with an interference or friction fit between the ring and the walls of the race. This is advantageous during remanufacturing since the ring of LEDs need only be snapped into place in a single step. However, the ring of LEDs might just as well be held in place with fasteners such as screws or with adhesive if desired. An electrical cable 21 is connected to the LEDs of the ring and terminates in a waterproof connector 22. The connector 22 is configured to be connected to the existing third brake light circuitry of the vehicle. In this way, the LEDs of the ring are illuminated whenever the standard brake lights at the sides of the vehicle are illuminated by depression of the brake pedal within the vehicle.

Figure 2:
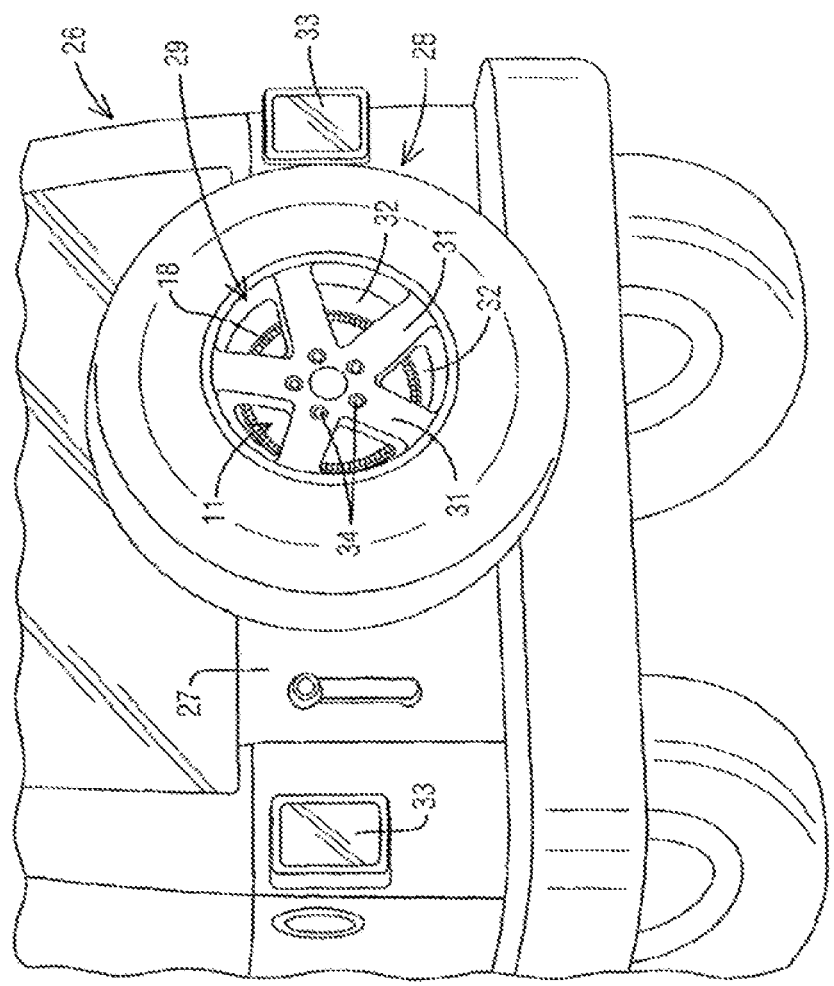
FIG. 2 is a perspective view of the auxiliary brake light of FIG. 1 mounted and functioning behind the spare tire of a Jeep® brand off-road vehicle.

To install the auxiliary brake light of FIG. 1, the spare tire of a vehicle is removed from the supporting lugs of the support structure at the rear of the vehicle. The auxiliary brake light 11 is then slid into place with the lugs extending through the elongated openings 16 and with the ring of LEDs 18 facing rearwardly. The spare tire is then replaced onto the lugs and secured in place with lug nuts in the normal way to complete the installation. The completed installation is shown in FIG. 2. Here, an off-road vehicle 26 has a rear tailgate 27 and a spare tire support structure (not visible) to which a spare tire 28 is mounted. The spare tire 28 includes a rim 29 formed with radial spokes 31 separated by openings 32. Many different rim designs with different spoke and opening configurations are available and used by off-road enthusiasts. The design shown in FIG. 2 is provided as an example only.

The spare tire support structure includes an array of rearwardly projecting threaded lugs 34 that align with the lug holes in the rim 29 of the spare tire. The spare tire is secured to the spare tire support structure with lug nuts as is known in the art. When the spare tire is secured, the auxiliary brake light 11 also is secured in place by being captured between the tailgate 27 and the rim 29 of the spare tire 28 as shown.

It can be seen in FIG. 2 that with all components mounted, some portions of the ring of LEDs 18 are visible directly through the openings 32 between the spokes 31 of the rim. However, other portions of the ring of LEDs are disposed behind the spokes of the rim and are hidden from direct visibility by the spokes. Further, there is no need to align the auxiliary brake light rotationally relatively to the rim because the ring of LEDs extends substantially continuously around the support disc. In FIG. 2, the LEDs of the ring 18 are shown illuminated along with the stock tail lights 33 of the vehicle, but when the brake pedal within the vehicle is released, the tail lights 33 and the auxiliary brake light 11 are extinguished.

Figure 3:
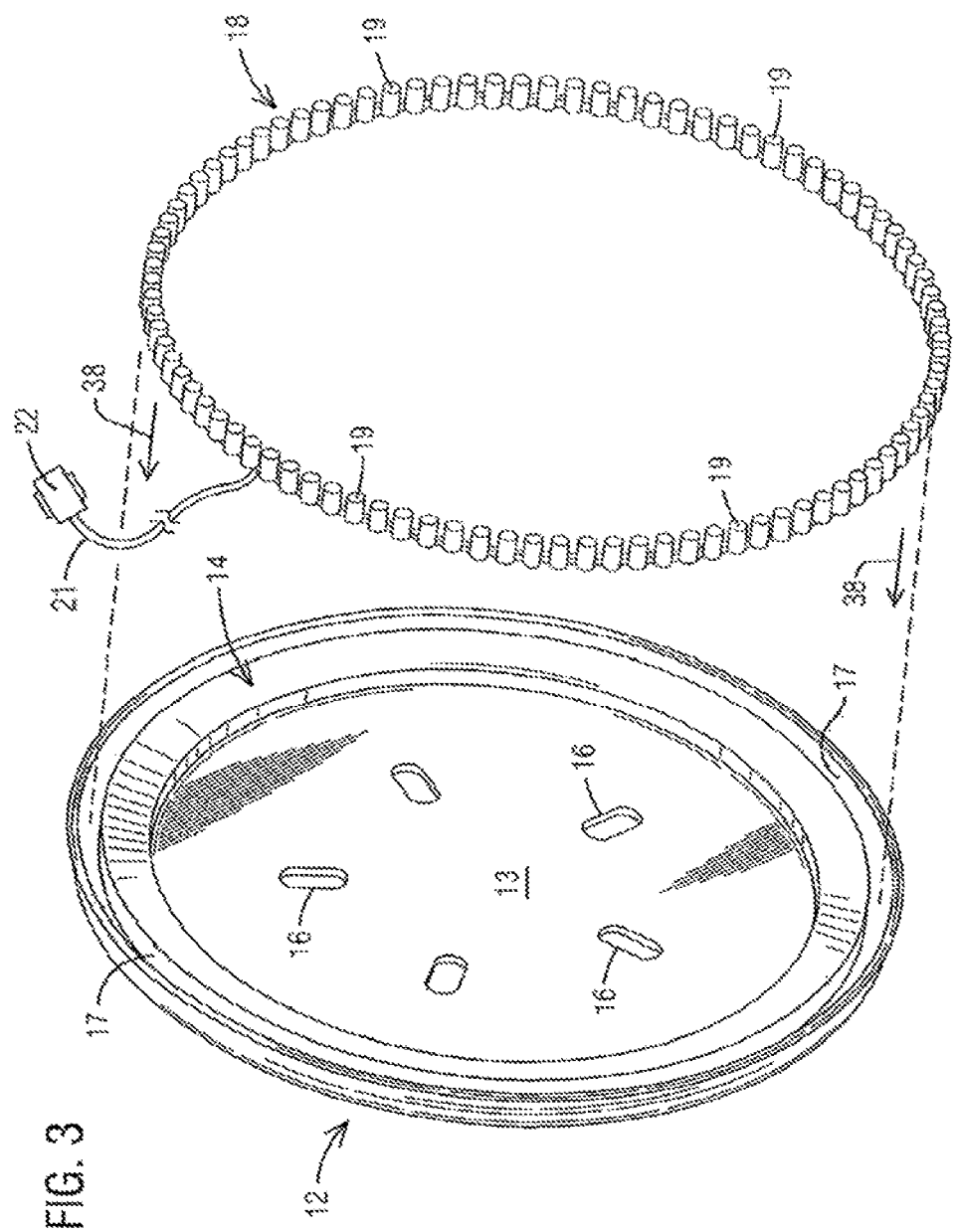
FIG. 3 is an exploded perspective view of the auxiliary brake light of FIG. 1 illustrating better a preferred LED ring configuration.

FIG. 3 is an exploded view showing components of the auxiliary spare tire tail light according to a preferred embodiment. The support disc 12 is shown with its central portion 13, its peripheral portion 14, and annular race 17 as described above. Elongated openings 16 are used to position the support disc on the threaded lugs of the spare tire support structure behind the spare tire. The substantially continuous ring 18 of LEDs 19 is attached to the support disc 12 by being moved into the annular race 17 as indicated by arrows 38. In this process, the connector 22 and cable 21 are threaded through a hole in the annular race so that they extend from the back of the support disc and can be connected to the brake light circuitry of the stock third brake light. In the preferred embodiment, the annular race is sized and configured so that the ring 18 of LEDs 19 "snaps" into the annular race and is held with a friction and/or interference fit. Alternatively, the ring 19 may be secured in the race 17 with an appropriate adhesive or fasteners.

With the auxiliary spare tire brake light installed and connected, the LEDs of the substantially continuous ring are lighted in addition to the standard brake lights of the vehicle whenever the driver applies the brakes. Light from the portions of the ring aligned with the openings between the spokes of the rim shines through the openings and is directly visible to drivers behind. In addition, light from the portions of the ring aligned behind the spokes falls on the backs of the spokes and is reflected onto the tailgate behind the rim of the spare tire. This lights the tailgate and results in a "glow" of bright red light against which the rim of the spare tire is silhouetted, rendering the rim visible at night. The combined result of the direct light, the glow, and the silhouetted rim is a very unique and highly noticeable signal to those behind that the brakes have been applied. It is believed that such a signal is more effective at preventing rear-end collisions than the stock third brake light and more effective than prior art devices with lights aligned only with the holes between the spokes of the rim.

The invention has been described herein in terms of preferred embodiments and methodologies considered by the inventors to represent the best mode of carrying out the invention. A wide gamut of additions, modifications, and deletions, both subtle and gross, may well be made to the illustrated exemplary embodiments without departing from the spirit and scope of the invention, which is determined by the claims.

What is claimed is:

1. An auxiliary spare tire brake light comprising:
    a support having a central portion and a peripheral portion, the peripheral portion including a depressed region extending around the central portion, the depressed region is defined by an inner generally upright wall and an outer generally upright wall, wherein a surface of the central portion is recessed from a surface of the peripheral portion, and the central portion is connected to the peripheral portion by a wall extending therebetween; and
    one or more lights disposed within the depressed region and in between the inner generally upright wall and the outer generally upright wall,
    wherein the support is free of a cover or lens disposed over the inner generally upright wall and the outer generally upright wall of the depressed region.

2. The auxiliary spare tire brake light of claim 1, wherein the support is disc shaped.

3. The auxiliary spare tire brake light of claim 2, wherein the lights are light emitting diodes (LEDs).

4. The auxiliary spare tire brake light of claim 3, wherein the lights are attached or received in the depressed region as a unitary ring.

5. The auxiliary spare tire brake light of claim 4, wherein the lights extend in a substantially continuous array around the central portion.

6. The auxiliary spare tire brake light of claim 4, wherein the lights are grouped in a plurality of groups and spacing of the lights within each group is uniform.

7. The auxiliary spare tire brake light of claim 5, wherein the lights are spaced closely together so that a first portion of the lights are adapted to align with openings in a rim of a spare tire and a second portion of the lights are adapted to align behind spokes that separate the openings in the rim.

8. The auxiliary spare tire brake light of claim 5, wherein the support includes an opening adapted to receive a threaded lug of a vehicle.

9. The auxiliary spare tire brake light of claim 7, wherein the second portion of the lights, when illuminated, are adapted to project light onto a back of the spokes to be reflected onto a back of a vehicle behind the spare tire to silhouette the rim of the spare tire against the back of the vehicle.

10. The auxiliary spare tire brake light of claim 1, wherein the lights are adapted to connect to circuity of a vehicle via a wire, an electrical connector, or both.

11. The auxiliary spare tire brake light of claim 10, wherein the lights are adapted to illuminate together when a brake pedal of the vehicle is depressed, and the lights are adapted to turn off when the brake pedal is released.

12. The auxiliary spare tire brake light of claim 10, wherein the support includes an opening that receives the wire, the electrical connector, or both to route the wire, the electrical connector, or both towards the circuitry of the vehicle.

13. The auxiliary spare tire brake light of claim 12, wherein the electrical connector is waterproof.

14. The auxiliary spare tire brake light of claim 1, wherein the lights are held in the depressed region by a friction fit, by an interference fit, or both.

15. The auxiliary spare tire brake light of claim 1, wherein the lights project light unobstructed by the support.

* * * * *